United States Patent [19]

Toohey

[11] 4,441,009
[45] Apr. 3, 1984

[54] ARC VOLTAGE CONTROL CIRCUIT FOR WELDING APPARATUS

[75] Inventor: William J. Toohey, San Diego, Calif.
[73] Assignee: Larry Russell, El Toro, Calif.
[21] Appl. No.: 372,194
[22] Filed: Apr. 26, 1982
[51] Int. Cl.³ .............................................. B23K 9/10
[52] U.S. Cl. ............................................. 219/124.03
[58] Field of Search ...................... 219/124.03, 124.02, 219/124.34; 318/612, 611

[56] References Cited

U.S. PATENT DOCUMENTS

| | | | |
|---|---|---|---|
| 3,777,115 | 12/1973 | Kazlauskas et al. | 219/124.03 |
| 3,989,921 | 11/1976 | Ohi et al. | 219/124.03 |
| 3,995,208 | 11/1976 | Parr | 318/612 |
| 4,151,394 | 4/1979 | Cecil | 219/124.34 |

Primary Examiner—C. C. Shaw
Attorney, Agent, or Firm—Jackson, Jones & Price

[57] ABSTRACT

An improved control circuit is disclosed for controlling the arc voltage of welding apparatus. The circuit includes an automatic servo control circuit operative to gradually start the electrode positioning motor in the presence of an error signal indicating that the arc voltage is not at the desired level, to accelerate the motion of the positioning motor until the error signal is nulled and then quickly decelerate the motor to minimize electrode overshoots. The improved circuit is operative to prevent electrode servo "hunting" and results in improved welding operation. Other features and improvements are disclosed.

7 Claims, 6 Drawing Figures

ARC VOLTAGE CONTROL CIRCUIT FOR WELDING APPARATUS

BACKGROUND OF THE INVENTION

1. Field of the Invention

The field of the invention is arc welding apparatus, and more particularly, circuits for controlling the arc voltages applied by arc welding apparatus.

2. Brief Description of the Prior Art

Arc welding apparatus are well known in the prior art. The quality of the weld is dependent upon maintenance of a proper arc length and voltage. It is desirable that a welding apparatus compensate for changes in welding parameters, introduced by workpiece variations and the like. For example, the workpiece may vary in thickness or resistance, and unless the arc voltage is compensated for such variances, the weld will not be uniform in it characteristics.

In my co-pending application entitled "Welding Apparatus," Ser. No. 372,193 filed Apr. 26, 1983, an apparatus is described for mounting the welding electrode on a fixture which is servo operated to move the electrode in relation to the workpiece. While servo positionable electrodes per se are not new, the servo circuits employed in the past have suffered the disadvantages of oversensitivity to variations in arc voltage, such that the electrode will oscillate or "hunt" for the electrode position at which the nominal arc voltage is obtained. This excessive "hunting" is of course deleterious to the weld.

Accordingly, a need exists for an arc voltage control circuit which maintains the arc voltage within a proper range about the nominal voltage, without excessive servo "hunting."

SUMMARY OF THE INVENTION

The present invention comprises a novel circuit adapted to sense variations in the arc voltage from the nominal arc voltage, and to compensate for such variations only if the variations are outside a predetermined "deadband" range, by gradually accelerating the servo movement until the arc voltage is within range, and then quickly decelerating and stopping the servo movement.

The preferred embodiment of the improved circuit consists generally of (i) an arc voltage detector and (ii) a preset arc reference voltage generator, each coupled to a (iii) voltage comparator for generating an error signal, (iv) a deadband error comparator circuit for determining conditions when the error signal exceeds a predetermined deadband range and providing a control signal determined by the difference between the error signal, the deadband reference, and a servo gain factor, (v) a motor servo circuit which is operative to generate, in the presence of a control signal, a ramp signal having a predetermined and selectable acceleration slope characteristic for gradually accelerating the servo motor until the control signal is nulled, and a deceleration slope characteristic having a relatively small time constant for stopping motor operation in a relatively short time interval, and (vi) a motor drive circuit responsive to the output of the motor servo circuit.

The circuit achieves correction of the arc voltage without the deleterious overshooting or "hunting" characteristic of prior art equipment. Once the nominal voltage range has been attained, the servo motor is rapidly decelerated and stopped.

Other features and advantages are disclosed.

DETAILED DESCRIPTION OF THE PREFERRED EMBODIMENT

The present invention comprises a novel arc voltage control circuit for an arc welding apparatus. The following description of the invention is provided to enable any person skilled in the welding apparatus art to make and use the present invention, and sets forth the best mode presently contemplated by the inventor for carrying out his invention. Various modifications, however, to the preferred embodiment, will be readily apparent to those skilled in the art, and generic principles defined herein may be applied to other embodiments. Thus, the present invention is not intended to be limited to the embodiment shown, but is to be accorded the widest scope consistent with the principles and novel features described herein.

The present invention is related to the apparatus described in my co-pending application, entitled "Welding Apparatus," Ser. No. 372,193 filed Apr. 26, 1982 wherein is described my invention relating to the automatic retraction of the welding electrode above the surface a predetermined distance to initiate the welding procedure. As is described in that application, the welding electrode is mounted in a servo motor-driven fixture, which is operable to move the electrode toward or away from the workpiece. Prior to commencing the welding operation, the operator initiates a downward movement of the electrode, which "jogs" downward until the welding electrode contacts the workpiece, whereupon a micro-switch is engaged, the servo motor is reversed, and the electrode jogged upwardly a predetermined distance for the start of the welding. Reference is made to my copending application for further description of the specific mechanism for positioning the electrode. In accordance with the present invention, once the electrode has been prepositioned and the welding voltage attained, automatic torch positioning apparatus is engaged to maintain an approximately constant welding voltage by variation of the position of the torch relative to the workpiece.

Figure 5:
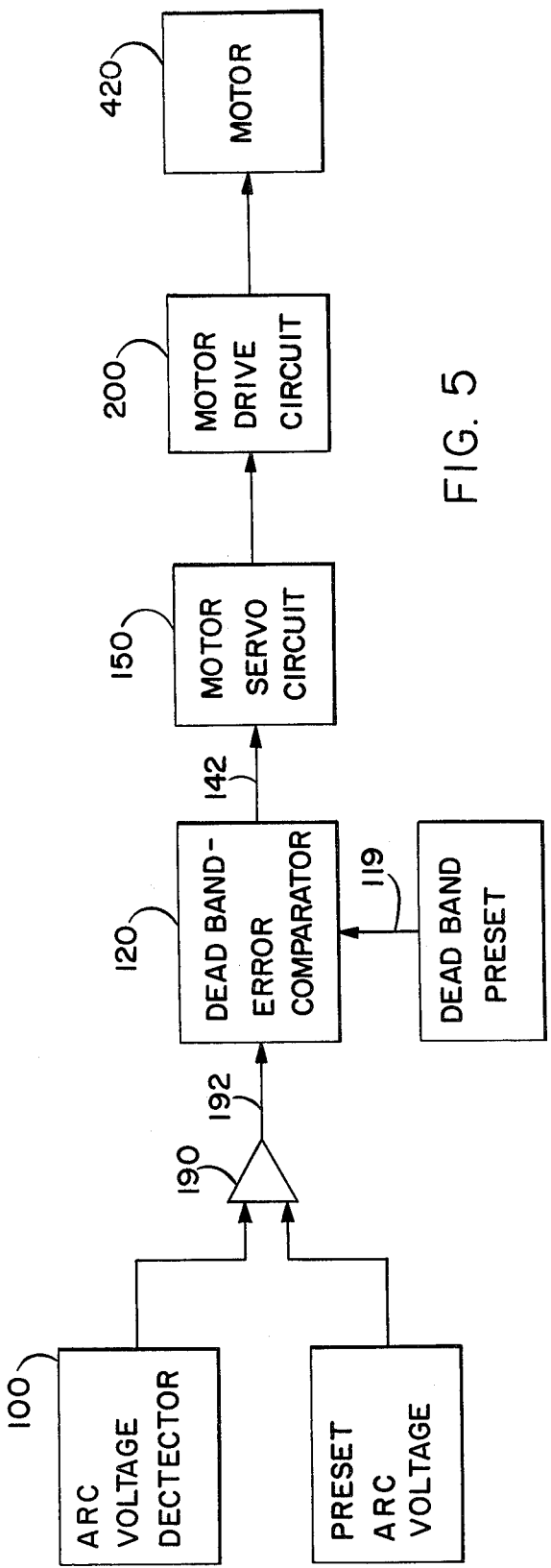
FIG. 5 is a block diagram of the functional elements of the preferred embodiment when operating in the automatic servo mode.

Referring now to FIG. 5, a block diagram of the preferred embodiment when operating in the automatic servo mode is illustrated. The absolute value of the actual welding voltage is detected by detector 100, and compared with the present arc voltage value by comparator 190. The error signal 192 from comparator 190 will either be a positive or negative voltage, depending upon the value of the actual arc voltage relative to the preset arc voltage. Error signal 192 is compared at the deadband-error comparator 120 with the deadband preset value. The preset value represents the range in the error signal magnitude about which no servo correction will be made. That signal will be at ground potential unless the error signal magnitude is greater than the preset deadband value. When the magnitude of the error signal is greater than the deadband, the output 142 represents a difference signal between the deadband preset value 119 and the product of a servo gain factor and the difference between the error signal 192 and the deadband preset value. Control signal 142 is coupled into motor servo circuit 150. Circuit 150 controls motor drive circuit 200, which in turn drives motor 420. Circuit 150 generates a ramp signal, in the presence of output 142, of either positive or negative slope depending upon the polarity of output 142, which controls motor drive circuit 200. The ramp signal causes the servo motor to rotate in the appropriate direction to move the electrode so as to reduce the error signal. The ramp signal causes the motor to slowly accelerate from the stopped position to a clamped maximum speed. Once the error signal has been reduced to a value within the deadband range, the ramp signal quickly returns to a null level at a fixed, relatively steep rate so as to stop motor operation.

Figure 1:
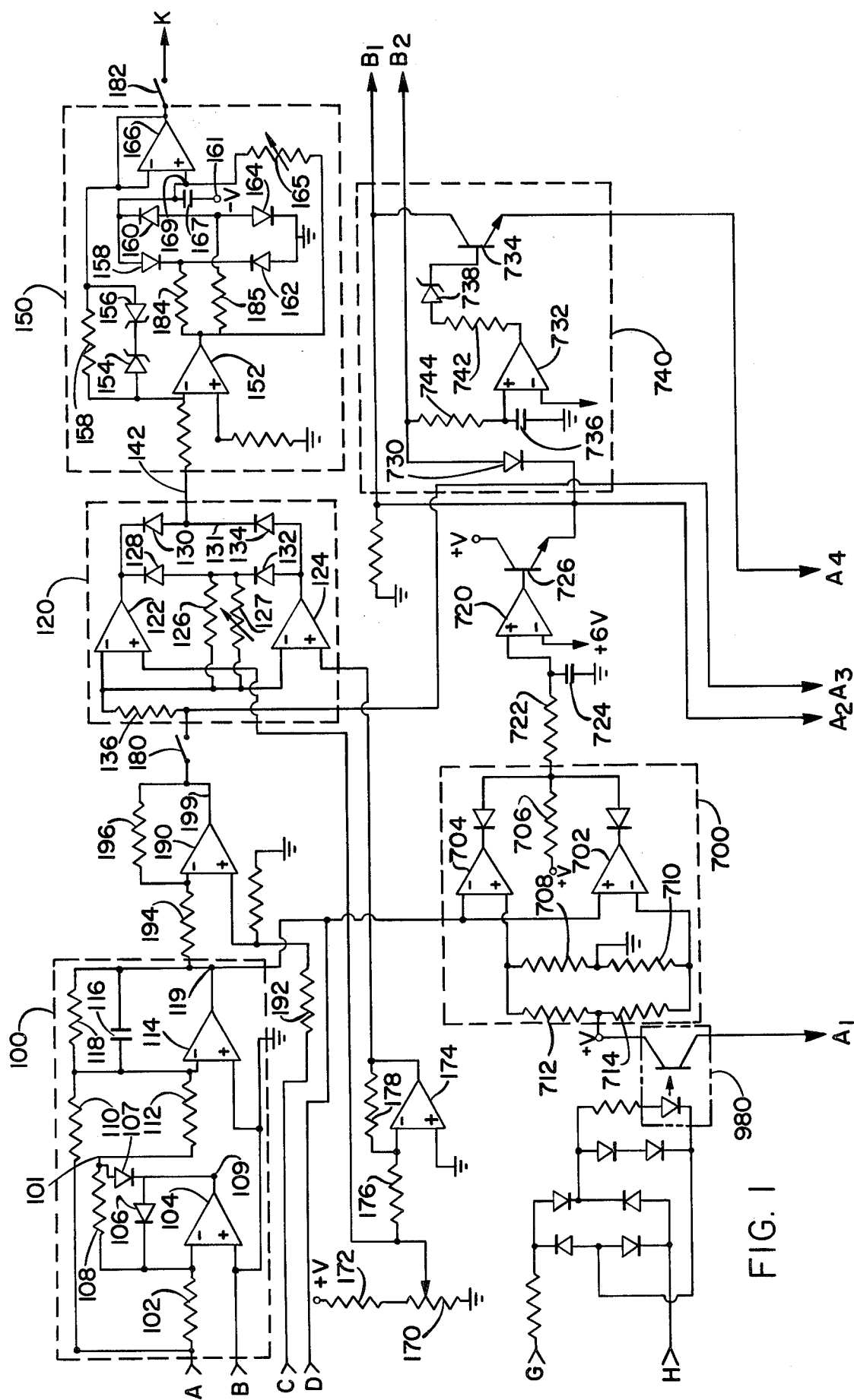
FIGS. 1-4 are schematic drawings illustrating the circuitry of the preferred embodiment of the present invention.

Referring now to FIG. 1, a schematic of some of the components of the circuit outlined in block form in FIG. 5 is shown. The subcircuit outlined in phantom line 100 corresponds to the arc voltage detector shown in FIG. 5. Similarly, subcircuits 120 and 150, also outlined in phantom line in FIG. 1, correspond respectively to the deadband-error comparator circuit and motor servo circuit shown in FIG. 5. The inputs to circuit 100 are delivered at nodes A and B, respectively, from the torch 10 and workpiece 20 connections illustrated in FIG. 3. The voltage between the torch 10 and workpiece 20 is filtered by capacitors 12 before being provided to circuit 100. Circuit 100 acts as an absolute value detector, providing at its output a positive voltage signal representative of the absolute magnitude of the filtered arc voltage. While the operation of circuit 100 will be readily apparent to those skilled in the circuit art, it is noted that, for positive arc voltages, diode 106 is back biased, allowing gain resistor 108 to operate so that amplifier 104 is in an amplifying mode. Resistors 102, 108, 110 and 118 are nominally 20 Kohm resistors, and resistor 112 a 10 Kohm resistor.

Op amp 114 acts as an inverting summing amplifier, summing and inverting the voltages developed across resistor 110 and resistor 112. For example, with a +10 volt input at node A, the voltage at node 101 will be inverted at approximately −10 volts, and the voltage across resistor 110 will be +10 volts due to the differences in the values of resistors 110 and 112. The input at op amp 114 will be at −10 volts and when inverted, the voltage output at node 119 will be at +10 volts, i.e., the same as the input voltage.

For negative arc voltage inputs to circuit 100, e.g., −10 volts, diode 106 will conduct, leaving the voltage at node 109 at approximately ground, while the voltage drop across resistor 110 will leave at approximately −10 volts, therefore, with the inverting action of the amplifier 114, a voltage of +10 volts will be presented at node 119. The circuit 100 will operate with rectifying action due to capacitor 116 and the input capacitors filtering the arc voltage.

Figures 3, 4:
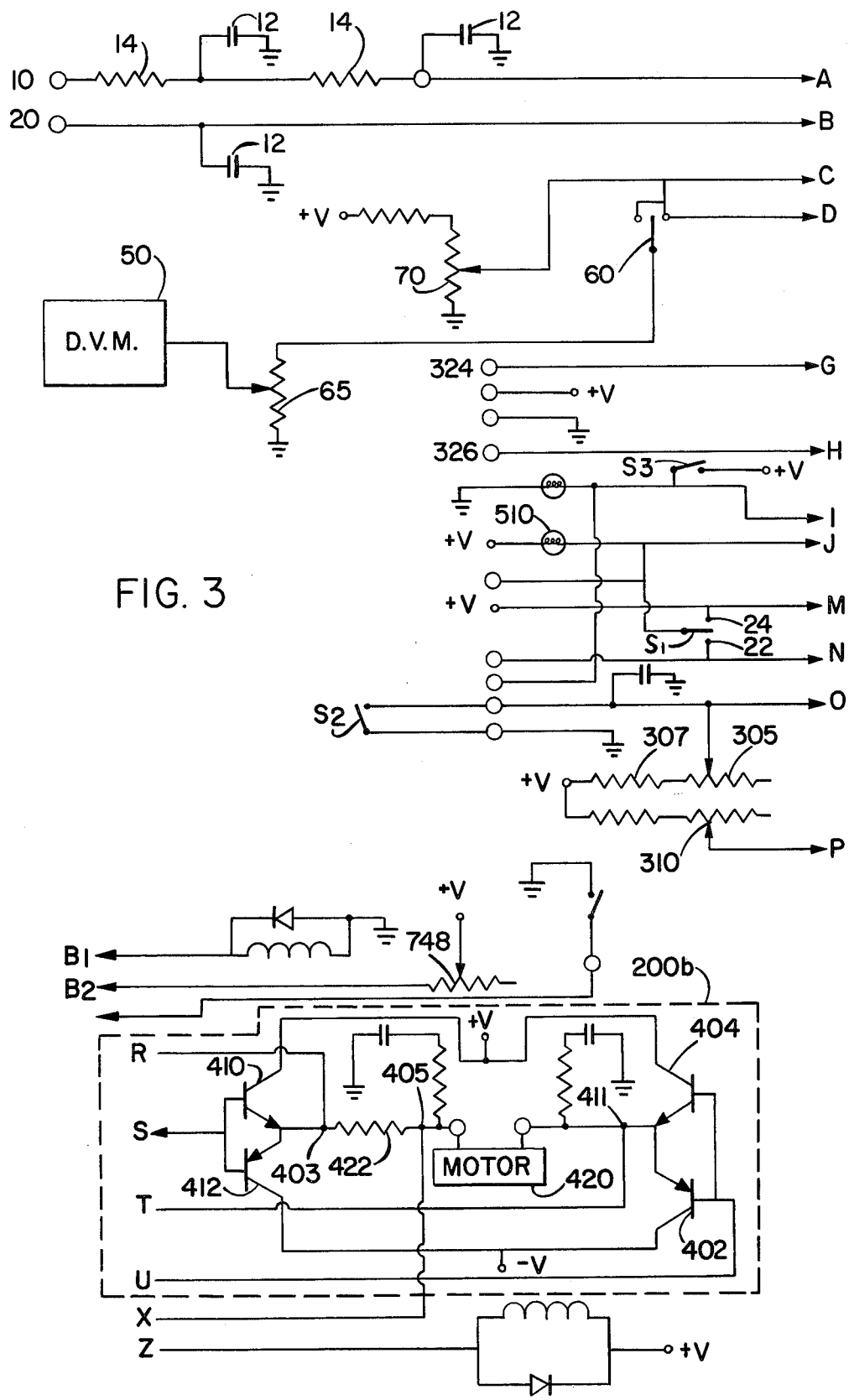

The output at node 119 is representative of the absolute magnitude of the actual arc voltage. The operator, however, is able to set a nominal or preset arc voltage by the use of digital voltmeter 50 and potentiometer 70, as shown in FIG. 3. Thus, with relay contact 60 in the voltage preset mode, a 12 volt supply voltage +V is coupled through potentiometer 70, through DVM calibration potentiometer 65 to the DVM, with the voltmeter monitoring the potential as developed on the wiper of potentiometer 70. By manipulating potentiometer 70, the operator may preset the desired voltage, which will depend upon the welding parameters, e.g., the workpiece material and the like. During welding operation, the digital voltmeter 50 is coupled through relay contact 60 and node D to monitor the level of the output of circuit 100, the actual arc voltage.

The preset voltage level is continuously coupled through node C and resistor 190 (nominally 20 Kohm) to provide a reference level to the "plus" input of op amp 190. Op amp 190 corresponds to the comparator 190 shown in FIG. 5. The output of circuit 100 is coupled through resistor 194 (nominally 20 Kohm) to the "minus" input of comparator op amp 190. Feedback resistor 196 (nominally 20 Kohm) provides feedback between the minus input and the output of comparator 190. Resistor 198 (nominally 20 Kohm) couples the "plus" input of comparator 190 to ground. Comparator 190 provides an output or error signal at node 199 equivalent to the difference between the reference voltage at node C and the signal at node 119, i.e., the absolute actual arc voltage. Error signal 199 is coupled through switch 180 to a second comparator circuit 120.

Circuit 120 operates to provide a null output when the error signal is zero or within a range of the preset deadband voltage. This deadband voltage is set by the position of potentiometer 170 by the operator. Resistors 170 and 172 comprise a 1K potentiometer and 1.4 Kohm resistor, respectively. Thus, the operator is able to adjust the deadband voltage from 0 to about 4.5 volts. This deadband voltage is provided to the "plus" input of amplifier 122 and is also inverted by amplifier 174, and then provided to the "plus" input of amplifier 124 in circuit 120. Resistors 176 and 178 comprise 20 Kohm resistors in the preferred embodiment. The operation of circuit 120, when the error voltage at node 199 is greater than the deadband voltage, is to provide the following output signal at node 131:

$$E \text{ output} = E_{DB} - \frac{\frac{R_{126} \cdot R_{127}}{R_{126} + R_{127}}}{R_{136}} \cdot [E_R - E_{DB}]$$

where
 E output = the voltage at node 131
 $E_{DB}$ = preset deadband voltage
 $R_{126}$, $R_{127}$, $R_{136}$ = values of resistors 126, 127 and 137
 $E_r$ = error signal at node 119.

This output voltage is thus a function of the deadband voltage, the error signal, and a gain factor determined by the values of resistors 126, 127 and 136. Resistors 136 and 126 are nominally 2 Kohm and 100 Kohm resistors, respectively, and potentiometer 172 a 200 Kohm potentiometer. Thus, for these resistive values, the gain factor will theoretically range from zero to about 33.

The resultant output signal at node 131 provides the input to motor servo circuit 150. Circuit 150 includes amplifiers 152 and 166 being coupled together through feedback resistor 158 (nominally 20 Kohms) and zener diode limiters 154 and 156. These zener diodes have a nominal reverse bias breakdown voltage of 4 volts. The output of amplifier 152 is coupled to the "plus" input of amplifier 166 through variable resistor 165, which in the preferred embodiment is nominally a 500 Kohm potentiometer. The "plus" input to amplifier 156 is also coupled to the "minus" supply voltage (nominally −12 volts) through capacitor 167, nominally a 100 microarad capacitor. The output of amplifier 152 is also coupled to the "plus" input of amplifier 166 through the resistor and diode network comprising resistors 184 and 185 (nominally 2 Kohm resistors) and to diodes 158, 160, 162 and 164. (It is noted that reference herein to a "minus" input to an op amp is to the inverting input, while reference to the "plus" input is to the noninverting input.)

Circuit 150 operates in the following manner. When a positive output signal is provided at node 131, the output of amplifier 152 will be driven to its saturated "minus" voltage. Capacitor 167 will be charged away from zero potential through variable resistor 165. The diodes do not provide a current path for charging capacitor 167, since a path of less resistance is available through diode 167 (or diode 162, for negative voltages) to ground. In a similar fashion, with a positive output voltage at node 131, the output of amplifier 152 will be at its saturated positive voltage. Once again, the only current path for charging capacitor 167 is through variable resistor 165. Since amplifier 166 is configured as a unity gain follower, while capacitor 167 is being charged, the amplifier 166 output will be a ramp signal whose slope is determined by the time constant of capacitor 167 (nominally a 100 microfarad capacitor) and potentiometer 164 (nominally a 500 Kohm potentiometer). Thus, the operator can vary the time constant by adjustment of potentiometer 165, thereby varying the time delay before actuation of the servo motor to correct the arc voltage. This ramp signal is fed back to amplifier 152 through resistor 158 (nominally 20 Kohms) and the zener diode limiter circuit to the "minus" input of amplifier 152. This feedback, as well as the output of op amp 166, is of course limited to ±4 volts, the zener reverse bias breakdown voltage. The output of circuit 150 is fed through switch 182 through node K to motor drive circuit 200 (see FIG. 2).

The motor drive circuit 200 is divided into circuit 200a (FIG. 2) and 200b (FIG. 4). Circuit 200a includes op amps 202, 218 and 228. Amplifiers 202 and 218 operate in a complimentary fashion to drive complimentary transistor pairs 410, 412 and 402, 404, which power the servo motor 420.

The output from servo circuit 150 is coupled through node K to the "minus" input of amplifier 202. The signal at node 211 is coupled through node R to the emitters of complimentary transistor pair 410, 412 (FIG. 4). The node 211 signal is also coupled through resistor 208 (nominally 10 Kohm) to the "minus" input to amplifier 218. Resistors 206, 207, 214 and 216 each have nominal 1 Kohm values. The output of amplifier 202 is coupled through resistor 206 and node 209 to the bases of complimentary transistors 410, 412.

The signal at node 213 is coupled through node T to the emitters of complimentary transistor pair 402, 404. The output of amplifier 218 is coupled through resistor 216 and nodes 216 and U to the bases of the complimentary transistors 402, 404.

Figure 2:
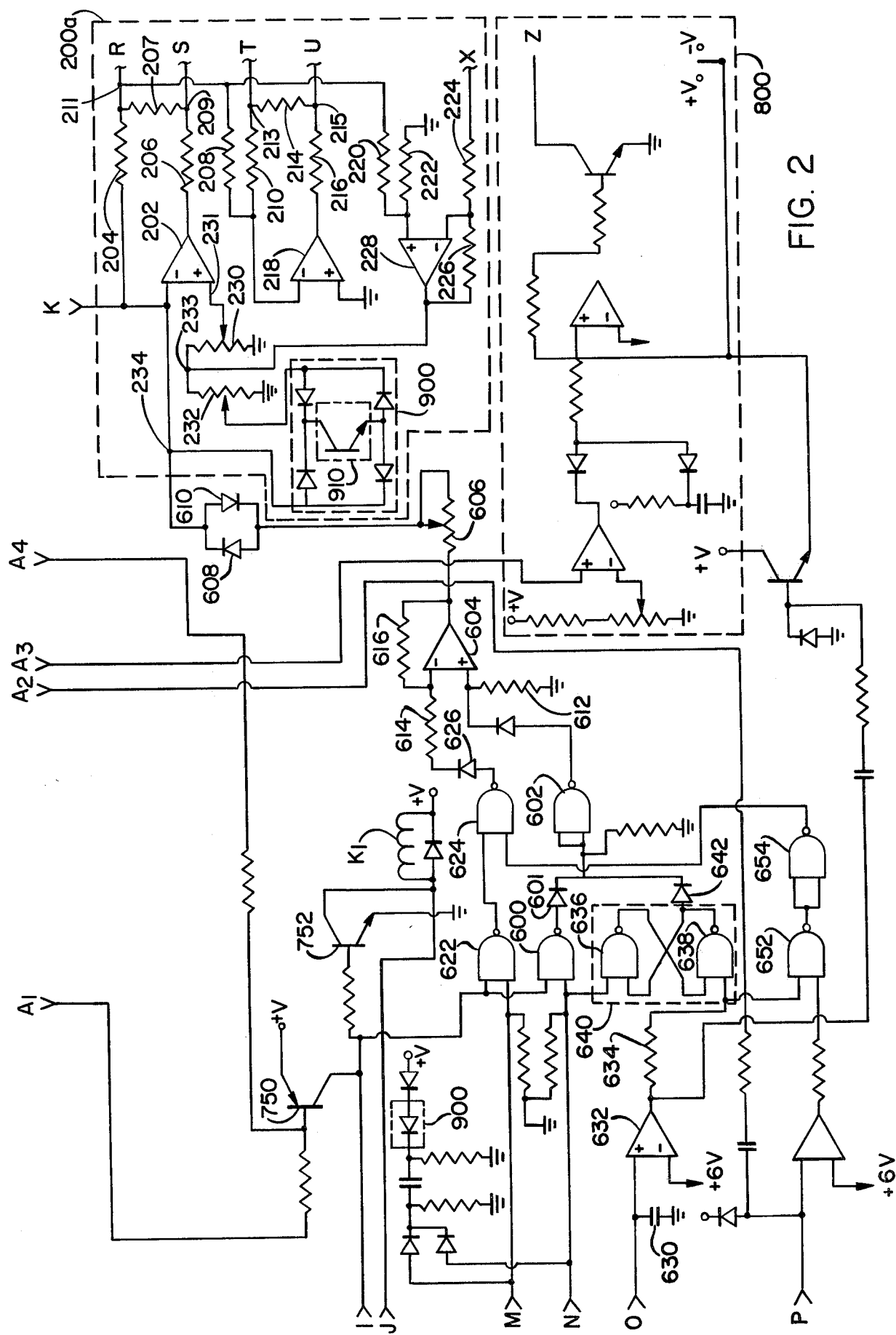

Feedback to circuit 200a is taken from nodes 403 and 411 (FIG. 4) through nodes R and T and resistors 206 and 210 (nominally 10 Kohms) to the "minus" inputs of amplifiers 202 and 218, respectively (FIG. 2). Taking the feedback from the emitters of the drive transistors eliminates any effect of the forward bias voltage drops of these transistors.

Resistors 224 and 226 are nominally 2 Kohms, and resistors 220 and 224 comprise 20 Kohm resistances. The output of amplifier 228 is coupled to node 233 and through potentiometer 230 to the "plus" input of amplifier 202 and to ground.

Circuit 200a receives the output from servo circuit 150. Assuming that the signal consists of a ramp signal with positive slope, the ramp will be inverted at nodes 211 and 209 by amplifier 202, and coupled to the emitters and bases, respectively, of transistors 410 and 412. There will be a positive voltage drop across resistor 207 from node 211 to node 209. Therefore, the signal applied to the bases of transistors 410, 412 will be positive with respect to the signals applied to the emitters. NPN transistor 410 will be biased "on," and PNP transistor 412 biased "off."

Still assuming a positive ramp voltage input to circuit 200a, the inverted ramp at node 211 is presented to amplifier 218, configured as a unity gain inverting amplifier. Thus, the voltage at signal node 213 will be positive with respect to that at node 215, biasing NPN transistor 404 "off" and PNP transistor 402 "on." Thus, a current path has been established, from the +V supply voltage, through transistor 410, resistor 422, the motor 420 armature, and transistor 402 to the negative supply voltage. As the ramp input signal to circuit 200a increases, so will the drive current through the motor, thereby accelerating the motor speed as the ramp increases.

Op amp 228 senses the current through the motor armature and its output provides IR compensation to the "plus" input of amplifier 202. This positive feedback serves to compensate for heat losses in the motor windings, and also to current limit the current through the motor, by providing a feedback current at the "minus" input of op amp 202 opposite to the control signal through node K. This current feedback flows through potentiometer 232 and network 900.

For negative ramp signals at node K, the operation of motor drive circuit 200 is reversed. Transistors 410 and 402 will be biased "off" and transistors 412 and 404 biased "on." A positive reference voltage will be presented to amplifier 202. Current flow through the motor, and the direction of motor operation, will be in the reverse direction.

The servo motor will raise or lower the electrode, thereby either lowering or raising the actual arc voltage and correcting the control signal at node 131. As the motor operates and accelerates, the error signal and the control signal will become smaller in an exponentially increasing fashion. Once the control signal nulls and the control signal at node 131 opens, the output of amplifier 152 will no longer be driven to a saturated condition, and the capacitor 167 will discharge to ground potential either through diode 158 and resistor 184, or diode 160 and resistor 185, depending upon the polarity of the charge on capacitor 167 at node 169. One of diodes 164 will clamp the discharge level to ground, as it will be biased "on" once the voltage on node 169 approaches the diode "biased on" voltage drop.

Figure 6:
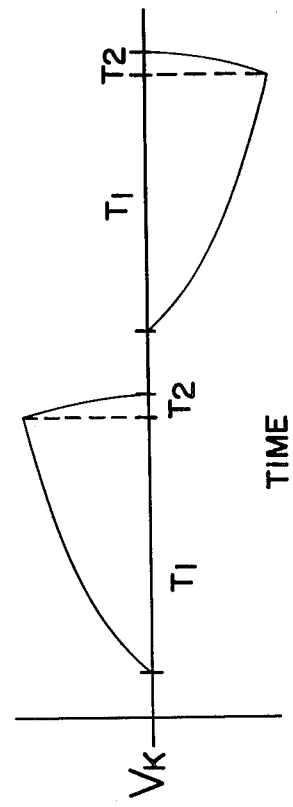
FIG. 6 is a graph illustrating the servo circuit output as a function of time.

A current path to charge or discharge capacitor 167 always exists through variable resistance 165. During discharge operation through 2 Kohm resistance 184 or 185, this path is of negligible effect. Thus, servo control circuit 150 operates to provide a motor control signal which ramps up on down in the motor accelerating mode, at a rate dependent upon the capacitor 167-resistor 165 time constant. In a motor decelerating mode, the signal discharges to nearly the ground potential, thereby stopping motor operation, at a rate dependent upon the capacitor 167-resistance 184 or 185 time constant, and the control signal decay to a null due to the electrode positioning. Since resistors 184 and 185 are 2 Kohm resistors, and resistor 165 is a 500K potentiometer, the deceleration mode time constant will, for significant resistance settings of resistor 165, be substantially shorter. This causes the motion to quickly stop once the error voltage has been nulled, thereby minimizing the possibility of a position overshoot. An exemplary waveform of the signal at node K is shown in FIG. 6, illustrating the acceleration mode during interval T1 node and deceleration mode during interval T2.

Having described the operation of the circuitry shown in block diagram form in FIG. 5, the overall operation of the circuitry disclosed in FIGS. 1-4 will now be generally described. The operator initiates operation by placing switch S1 (FIG. 3) in contact with contact 22, a "jog downward" position. With S1 continuously held in this position, the electrode is carried downward by operation of motor 420 until the electrode contacts the workpiece, causing micro-switch S2 to close, initiating an upward movement to the electrode to a predetermined distance away from the workpiece. Once the electrode has reached this predetermined distance, which may be adjusted by potentiometer 305 (nominally 1 Megohm potentiometer), the operator may release switch S1 and initiate the arc voltage firing. Once the arc voltage is in range, a delay timer is initiated to allow the arc to stabilize. Upon elapsement of the delay timer, an autorelay is tripped which closes switches 180 and 182, coupling the deadband comparator 120 motor servo circuit 150 into operation. The operator may always switch from automatic servo operation to manual operation by closing switch S3, de-energizing the autorelay and opening switches 180 and 182. Even when servo circuit 150 is in operation, its output signal may be overridden in the presence of a lockout signal from the welding power supply presented across terminals 324 and 326 (FIG. 3).

While the operation of the circuit will be apparent to those skilled in the art, placing switch S1 in the "jog down" mode couples node N to node J (FIG. 3). A manual control signal is provided through NAND gate 600, diode 601, NAND gate 602, amplifier 604, jog speed settiing resistor 606 (50 Kohm potentiometer), and diode 608 to amplifier 202 of motor drive circuit 200a. (If S1 is in the "jog upward" mode, node M is activated, and a control signal passes through NAND gates 622 and 624, diode 626, 20 Kohm resistor 614, is inverted by amplifier 604 (resistance 616 and 612 are nominally 18 Kohm and 100 Kohms respectively), and thence through potentiometer 606 and diode 610 to the "minus" input of amplifier 202.

As the electrode jogs downward, it will contact the workpiece, closing micro-switch S2. Capacitor 630, which will have been charged to the positive supply voltage (nominally 12 volts) through 20 Kohm resistor 307 and 1 megohm resistor 305, will be discharged to ground and held there so long as switch S2 is closed. Thus, a capacitor 630 couples the "plus" input of amplifier 632 to ground, while the "minus" input is coupled to a +6 volt source. With the "plus" input grounded, the amplifier 632 output immediately switches from +12 volts to −12 volts, tripping flip-flop arrangement 640 (comprising NAND gates 636 and 638). Flip-flop 650 inhibits downward motion of the electrode while in this preset mode. The low output from amplifier 632 also forces an upward movement of the electrode, through NAND gates 652 and 654. Thus, a positive polarity signal is provided by network 640 through diode 642, to NAND gate 602, resulting in a negative polarity signal being provided to amplifier 202, and immediately reversing the direction of motion direction from a downward to an upward direction.

As the electrode raises above the workpiece, micro-switch S2 opens, and capacitor 630 commences to charge to the positive supply voltage level, its charging rate being determined by the sum of resistances 305 and 307 and the value of capacitor 630 (nominally 20 microfarads). Once the capacitor charges to +6 volts, the polarity of the output of amplifier 632 switches from negative to positive, turning off the upward movement of the electrode through gates 652, 654 and 624. The control signal to the motor drive circuit 200a will be extinguished, and the motor stopped.

Another feature of the disclosed circuit is shown in FIG. 1. In-range arc voltage detection circuit 700 receives the detected arc voltage from circuit 100. The circuit provides an output when the arc voltage is in range, i.e., approximately 5 volts to 50 volts. Resistors 708 and 710 are 5 Kohm and 0.5 Kohm resistors, respectively, resistor 712 a 7 Kohm resistor, resistor 714 and 11.4 Kohm resistor, and resistor 706 is a 10 Kohm resistor.

Amplifier 720, with 10 Kohm resistor 722 and 20 microfarad capacitor 724, and a +6 volt source coupled to the "minus" input, comprises an antichatter filter or timer to provide an approximately 150 millisecond delay, to accommodate any oscillators in the arc voltage which would otherwise take the arc voltage out of the 5-50 volt range.

Once the delay is timed out, transistor 726 is turned on, diode is forward biased, starting timer circuit 740, which is configured to provide up to ten-second delay (depending upon the setting of potentiometer 748) before timing out and providing a low signal at node A4. Capacitor 736 is a 100 microfarad capacitor, resistors 744 and 744 are 10 Kohm resistors, and the breakdown voltage of zener diode is six volts.

Once timer 740 times out, transistor 750 will be turned off, and transistor 752 turned on energizing autorelay K1, thereby closing switches 180 and 182. The circuit will be in the automatic control mode. Manual jogging of the electrode will be inhibited in this automatic mode, due to the input states at NAND gates 622 and 600.

Another feature of the present circuit is sudden change detector 800, which detects sudden large (increasing) changes in the arc voltage, such as occurs in a weld burn-through condition. Upon detection of a sudden large change, the electrode is jogged upwardly automatically to a retracted position, triggered by action of flip-flop 640.

The disclosed circuit also uses a signal from the welding power supply indicating a low current mode operation to disable automatic servo action. The low current mode typically occurs to allow the workpiece to cool down. The supply signal triggers photocoupler 980 (FIG. 1) causing the servo circuit output to be disabled to prevent an erroneous electrode movement caused by the low current condition.

What is claimed is:

1. An improved arc voltage control circuit for controlling an electrically positionable welding electrode relative to a workpiece, comprising:

arc voltage detection means for providing a first signal indicative of the arc voltage;

reference means for providing a second signal indicative of a reference arc voltage level;

comparator means for providing an error signal indicative of the difference between the reference voltage level and the arc voltage;

electrode positioning means responsive to control signals;

servo circuit means responsive to said error signal for providing said control signal to said positioning means so as to cause said positioning means to position said electrode to diminish said error signal, said positioning occurring with an acceleration characteristic which is independent of the magnitude of the error signal.

2. The control circuit of claim 1 wherein said servo circuit means is further adapted to provide a deceleration characteristic to the positioning motion of said positioning means once said error signal has diminished to at least a predetermined level, so as to substantially stop the movement of said positioning means, the deceleration characteristic having a relatively short time constant in relation to said acceleration characteristic.

3. The control circuit of claim 2 wherein said control signal increases with time in accordance with a first time constant to provide said acceleration characteristic and decreases in time in accordance with a second time constant to provide said deceleration characteristic, and said first time constant is relatively long in relation to said second time constant.

4. The control circuit of claim 3 wherein said positioning means comprises an electric motor, and said servo circuit means is adapted to slowly start said motor to correct an error signal and gradually accelerate the operation of said motor in accordance with said first time constant until said comparator provides an output signal indicating that the error has been corrected, and thence to cause said motor operation to quickly decelerate in accordance with said second time constant to stop the operation of said positioning means.

5. The control circuit of claim 5 wherein said control signal from said servo circuit means is in the form of a ramp voltage which increases in time in accordance with said first time constant and decreases in time in accordance with said second time constant and means for adjusting the first time constant so that the sensitivity of the servo circuit to error signals may be changed without affecting the rate at which the motor will come to stop when being driven by the decreasing ramp voltage.

6. An improved arc voltage control apparatus for positioning a welding electrode relative to a workpiece, comprising:

electric motor means operatively coupled to said welding electrode such that rotation of the shaft of said motor in a first direction causes said electrode to be advanced toward the workpiece, and rotation in a second direction causes said electrode to be retracted away from said workpiece;

arc voltage detector means for providing a signal indicative of the magnitude of the arc voltage;

reference means for providing a second signal indicative of a reference arc voltage level;

comparator means for providing an error signal indicative of the difference between the reference voltage level and the arc voltage;

deadband generator means for generating a deadband reference signal, comparing said deadband reference signal to said second signal, and generating a third signal indicative of the difference between said deadband reference and said second signal;

servo circuit means responsive to said third signal for providing a control signal to said servo motor only when the magnitude of said second signal is larger than said deadband reference signal, said servo circuit means further being arranged so that the control signal increases to a maximum amplitude which is a function of the magnitude of the third signal at a first rate which is independent of the magnitude of the third signal and decreases at a second rate in the absence of the third signal to stop the servo motor, whereby the servo motor speed is increased to a velocity which is a function of the magnitude of the third signal and a rate which is independent thereof.

7. The arc voltage control apparatus of claim 6 wherein said servo circuit means is arranged to generate the control signal in the form of a ramp voltage which increased in accordance with a first time constant in response to the third signal to accelerate said positioning means and decreases in accordance with a second time constant to cause the positioning means to stop and further including means to adjust the first time constant to vary the sensitivity of the apparatus in responding to changes in the arc voltage.

* * * * *